United States Patent
Navar et al.

(10) Patent No.: US 6,915,445 B2
(45) Date of Patent: Jul. 5, 2005

(54) FAULT-PROTECTION MECHANISM FOR PROTECTING MULTI-PROTOCOL-LABEL SWITCHING (MPLS) CAPABILITY WITHIN A DISTRIBUTED PROCESSOR ROUTER OPERATING IN AN MPLS NETWORK

(75) Inventors: Venu Gopal Navar, San Jose, CA (US); Sundara Vadive Murugan, Fremont, CA (US); Bora Akyol, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 505 days.

(21) Appl. No.: 10/142,242

(22) Filed: May 8, 2002

(65) Prior Publication Data

US 2003/0212927 A1 Nov. 13, 2003

(51) Int. Cl.[7] .................................................. G06F 11/00
(52) U.S. Cl. ................................................................ 714/4
(58) Field of Search ............................................... 714/4

(56) References Cited

U.S. PATENT DOCUMENTS 6,332,198 B1 * 12/2001 Simons et al. ................. 714/6
6,715,097 B1 * 3/2004 Kidder et al. ................... 714/2
2003/0046604 A1 * 3/2003 Lau et al. ...................... 714/11
2003/0110287 A1 * 6/2003 Mattson ....................... 709/238

* cited by examiner

Primary Examiner—Bryce P. Bonzo
Assistant Examiner—Michael Maskulinski
(74) Attorney, Agent, or Firm—Donald R. Boys; Central Coast Patent Agency. Inc.

(57) ABSTRACT

A method for providing fault-tolerance for Multi-Path Label Switching (MPLS) functionality in a multi-processor network routing node has the steps of (a) implementing an MPLS server application including state information, on a first and a second processor in the node; (b) designating the MPLS server on the first processor as a master server and the MPLS server on the second processor as a backup server, and providing MPLS functionality in the node with the master MPLS server; (c) directing all required MPLS events to both the master and the backup MPLS servers during operation; (d) monitoring operation of the master server; and (e) in the event of failure of the master server, designating the backup server as the master, allowing MPLS functions to continue on the routing node.

39 Claims, 3 Drawing Sheets

FAULT-PROTECTION MECHANISM FOR PROTECTING MULTI-PROTOCOL-LABEL SWITCHING (MPLS) CAPABILITY WITHIN A DISTRIBUTED PROCESSOR ROUTER OPERATING IN AN MPLS NETWORK

FIELD OF THE INVENTION

The present invention is in the field of data-packet-processing and forwarding over a data-packet-network and pertains in particular to fault protection mechanisms for protecting MPLS capability in network routers.

BACKGROUND OF THE INVENTION

The field of data communication has grown with the pace of new data routing equipment, switches, and techniques that have enabled all types of data to be transmitted over wide area networks (WANs) faster and in more reliable ways. Manufacturers are competing to introduce faster data routers and better methods for synchronizing and integrating state-of-the-art equipment provided by a variety of competitors. Newer protocols for transporting data are also being developed and refined.

One of the more recent protocol standards initiated by the Internet Engineering Task Force (IETF), which is a standards organization well-known in the art, for routing data more efficiently through a network, is known as multi-protocol-label-switching (MPLS). MPLS is an IETF initiative that enables traffic engineering over dedicated paths set-up through an MPLS network. Integration of network transmission data specific to more than one network protocol layer enable the paths, also known as label switched paths (LSPs). LSPs may be manually configured or, as in many cases, created as needed by intelligent routing software.

Creation of LSPs has given administrators more control in routing data around link failures, bottlenecks, or other trouble spots in a network topology. Further, MPLS can be used to manage different types of data streams routed over different LSPs. Quality of service (QoS) parameters can be set-up over specific paths such that high bandwidth data, such as streaming video, travels over a specific LSP, reducing latency from end to end.

Packets entering into an MPLS network are assigned labels by a first router of the MPLS network known as label edge router (LER). The LER determines to which existing LSP a particular type of packet will be assigned, and labels all of the same type packets for the same LSP. Once labeled packets arrive at a router of the MPLS network known as a label switch router (LSR), the labels can be switched from ingress value to egress value and forwarded on without requiring extensive look-ups or complete header processing. Once the packets arrive at a last LER before exiting an MPLS network the labels are stripped from all of the packets. Much information is publicly available on MPLS, therefore high-level details concerning its various applications, of which there are many, will not be provided in this specification. MPLS can be implemented in point-to-point protocol (PPP) and Ethernet implementations, SONET applications and so on.

In prior art, if a router operating in a LSP in an MPLS network fails in terms of MPLS function (setting up the LSPs using RSVP or LDP), then the entire LSP is compromised and data must be re-routed through another existing or a pre-configured backup LSP. Typical fault tolerance for an existing LSP in an MPLS network involves automatic protection switching (APS) or other similar protocols. Therefore, if a router in an LSP fails, a pre-configured LSP backup, if available, must be activated to continue in place of the former LSP. However, switchover must be completed within a 50 ms time window to meet APS requirements. This procedure can be quite tedious because there may be many hundreds of active LSPs through any given MPLS-based network, and the time requirement is often missed.

A data router known to the inventor uses a distributed processing architecture to manage packet routing. The router is termed by the inventor a Terabit Network Router (TNR), which was developed to improve data routing efficiency and cost-effectiveness in general. The distributed processing architecture comprises redundant cabinet-mounted apparatus, each of which comprises line cards that interface between internal router domain and the external connected network, fabric cards that comprise an internal data packet routing network within the router itself, and control cards that provide control routines, messaging, internal data distribution, and in some cases special packet processing duties. Further, in a preferred embodiment of the present invention, two of the control cards, known as the Global Master Control Card (GMCC) and backup-GMCC, provide additional control functions over the whole system.

Each card in a TNR typically has its own on-board processor and memory. Line cards also have physical interfaces comprising ingress/egress ports for transferring data. Prior art routers employing a single or at most, a few processors cannot be protected in terms of an MPLS server failure, because all of the work of the server involved typically executes on one processor.

It was described above that the standard of 50 ms for switchover to a backup LSP must be adhered to for APS protection to be successful. If a switchover process times out or fails over, the backup LSP will not exhibit a successful handshake and transmission will fail. It has occurred to the inventor that a distributed processor router can overcome some types of capability failure by virtue of its distributed architecture and internal networking capabilities involving individual components of the architecture.

What is clearly needed is a method and apparatus for a distributed processor router that allows MPLS server failure to occur within the router without exempting the router from MPLS service or compromising any existing LSPs that include the router as an LSR or LER.

SUMMARY OF THE INVENTION

In a preferred embodiment of the present invention a method for providing fault-tolerance for Multi-Path Label Switching (MPLS) functionality in a multi-processor network routing node is provided, comprising the steps of (a) implementing an MPLS server application including state information, on a first and a second processor in the node; (b) designating the MPLS server on the first processor as a master server and the MPLS server on the second processor as a backup server, and providing MPLS functionality in the node with the master MPLS server; (c) directing all required MPLS events to both the master and the backup MPLS servers during operation; (d) monitoring operation of the master server; and (e) in the event of failure of the master server, designating the backup server as the master, allowing MPLS functions to continue on the routing node.

In a preferred embodiment, in step (d), monitoring is accomplished by a software distribution module (SDM) executing on a third processor in the node. There may also be client MPLS applications executing on one or more processors in the node dedicated to processing incoming data packets, further comprising a step for passing information from the master MPLS server to the one or more MPLS clients.

In some embodiments the processors dedicated to processing incoming data packets comprise line cards (LC) with processors, the LCs each comprising one or more ports interfacing with the network for receiving and sending data packets, and control cards (CC) with processors, the CCs for providing control functions, and the MPLS servers are established on control cards, one of which becomes an MPLS master control card, and the other an MPLS backup control card. Further, in some embodiments the processors upon which MPLS servers are established are control cards (CC) with processors, the CCs for providing control functions, and the SDM is established on a CC other than those upon which MPLS servers are established.

In some embodiments a primary SDM is established on a first global master CC (GMCC) and a backup SDM is established on a global backup CC (GBCC), and wherein the global backup becomes the global master in the event of failure of the global master. There may also be a further step, once a GBCC becomes a GMCC, for establishing and enabling a new GBCC. In still further embodiments there may be a further step, once a backup MPLS server has become the master MPLS server, of designating and enabling a new backup MPLS server. In still further embodiments there may be a further step, once a backup MPLS CC has become the Master MPLS CC, of designating and enabling a new backup MPLS CC. The network may be the Internet network.

In some embodiments, in step (a), the MPLS server application is configured with a resource reservation protocol (RSVP) stack. Also, the MPLS server applications may be included with the SDM in a bootable software image, and the GMCC may determine server assignments at startup of the routing node. State information and data structures may be copied from the MPLS master server to the MPLS backup server at startup of the routing node after server task assignment and initialization.

In another aspect of the invention a control system for providing fault-tolerance for Multi-Path Label Switching (MPLS) functionality in a multi-processor network routing node is provided, comprising a master MPLS server application including state information, implemented on a first processor in the node, and a backup MPLS server application implemented on a second processor in the node. The control system is characterized in that the master server provides MPLS functionality with all MPLS events directed to both the master and the backup server, and control is switched to the backup server as master in the event of failure of the master server.

In some embodiments the system further comprises a software distribution module (SDM) executing on a third processor in the node, wherein the SDM monitors master MPLS function, and implements switchover as necessary. Also in some embodiments the system further comprises client MPLS applications executing on one or more processors in the node dedicated to processing incoming data packets, wherein information is passed from the master MPLS server to the one or more MPLS clients.

In some embodiments the processors dedicated to processing incoming data packets comprise line cards (LC) with processors, the LCs each comprising one or more ports interfacing with the network for receiving and sending data packets, and control cards (CC) with processors, the CCs for providing control functions, and the MPLS servers are established on control cards.

Also in some embodiments the processors upon which MPLS servers are established are control cards (CC) with processors, the CCs for providing control functions, and the SDM is established on a CC other than those upon which MPLS servers are established. In some cases a primary SDM is established on a first global master CC (GMCC) and a backup SDM is established on a global backup CC (GBCC), and wherein the global backup becomes the global master in the event of failure of the global master. In some cases, once a GBCC becomes a GMCC, a new GBCC is established and enabled. Also, once the backup MPLS server has become the master MPLS server, a new backup MPLS server is designated and enabled. Still further, in some cases, once a backup MPLS CC has become the Master MPLS CC, a new backup MPLS CC is designated and enabled.

The network may be the Internet network, and in some cases the MPLS server application is configured with a resource reservation protocol (RSVP) stack. Further MPLS server applications may be included with the SDM in a bootable software image.

In some embodiments of the control system the GMCC determines server assignments at startup of the routing node, and in some embodiments state information and data structures are copied from the MPLS master server to the MPLS backup server at startup of the routing node after server task assignment and initialization.

In yet another aspect of the invention a network routing node is provided, comprising a plurality of processors, and a control system for providing fault-tolerance for Multi-Path Label Switching (MPLS) functionality, the control system having a master MPLS server application including state information, implemented on a first of the plurality of processors, and a backup MPLS server application implemented on a second of the plurality of processors in the node. The routing node is characterized in that the master server provides MPLS functionality with all MPLS events directed to both the master and the backup server, and control is switched to the backup server as master in the event of failure of the master server.

In some embodiments there is further a software distribution module (SDM) executing on a third of the plurality of processors in the node, wherein the SDM monitors master MPLS function, and implements switchover as necessary. Also, some embodiments further comprise client MPLS applications executing on one or more of the plurality of processors in the node, the clients dedicated to processing incoming data packets, wherein information is passed from the master MPLS server to the one or more MPLS clients. The clients dedicated to processing incoming data packets may comprise line cards (LC) with processors, the LCs each comprising one or more ports interfacing with the network for receiving and sending data packets, and control cards (CC) with processors, the CCs for providing control functions, and the MPLS servers are established on control cards.

In some cases of the node the processors upon which MPLS servers are established are control cards (CC) with processors, the CCs for providing control functions, and the SDM is established on a CC other than those upon which MPLS servers are established. A primary SDM may be established on a first global master CC (GMCC) and a backup SDM established on a global backup CC (GBCC), and the global backup becomes the global master in the event of failure of the global master. In some cases, once a GBCC becomes a GMCC, a new GBCC is established and enabled. Also, once the backup MPLS server has become the master MPLS server, a new backup MPLS server may be designated and enabled. Still further, once a backup MPLS CC has become the Master MPLS CC, a new backup MPLS CC may be designated and enabled. The network can be the well-known Internet network.

In some embodiments the MPLS server application is configured with a resource reservation protocol (RSVP) stack. Also, the MPLS server applications may be included with the SDM in a bootable software image.

In some embodiments the GMCC determines server assignments at startup of the routing node. Also in some embodiments state information and data structures are copied from the MPLS master server to the MPLS backup server at startup of the routing node after server task assignment and initialization.

In embodiments of the invention described below in enabling detail, for the first time a system is provided for protecting multiple-protocol-label switching (MPLS) capability within a distributed processor router operating in an MPLS network.

BRIEF DESCRIPTION OF THE DRAWING FIGURES

DESCRIPTION OF THE PREFERRED EMBODIMENTS

Figure 1:
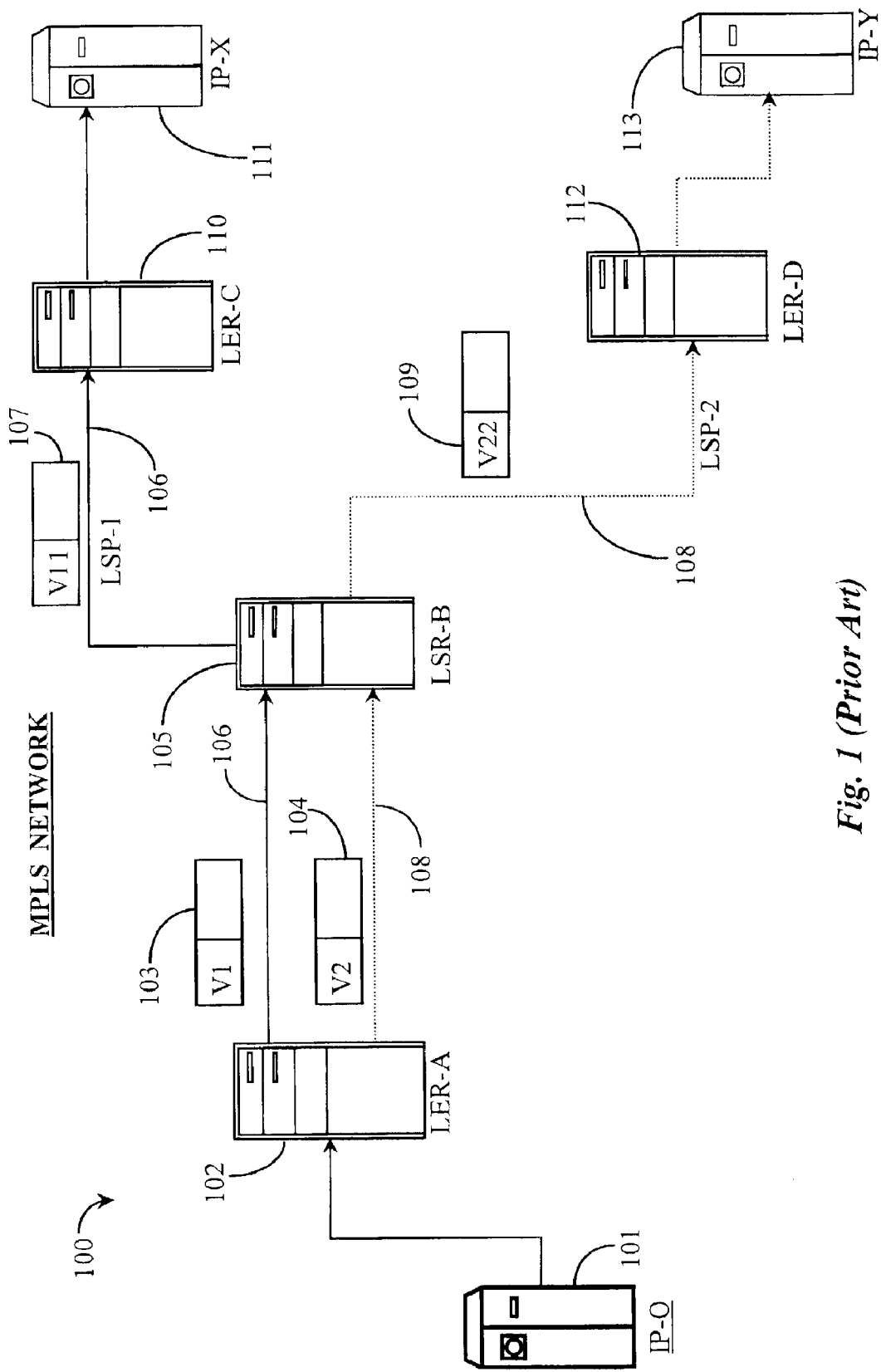
FIG. 1 is a network overview in the prior art illustrating separate LSPs through an MPLS-based network.

FIG. 1 is a network overview illustrating separate LSPs 106 and 108 existing in an MPLS-based network 100 according to prior art. As described above with reference to the background section, MPLS enables traffic engineering through label switched paths (LSPs) set up in the network. MPLS network 100 may be assumed to exist in a portion of an Internet network or other compatible wide-area-network (WAN). An IP host system 101 (IP-0), is illustrated in this example and represents a source of data entering (ingressing) into MPLS network 100. IP-0 101 may be an Internet Service Provider (ISP)-hosted node or any other type of vendor-sourced network node capable of routing data. MPLS may be compatible with a number of bandwidth reservation protocols known in the art such as resource-reservation-protocol (RSVP) and label-distribution protocol (LDP). In this prior-art example, it will be assumed that LSPs are engineered according to bandwidth reservation request and availability. However, it is noted there are many other criteria that can be used alone or in combination to define a set of rules for establishing an LSP.

A router 102, termed a label edge router (LER-A) is illustrated in this example as a first router of MPLS network 100 that receives data that will be forwarded, as labeled packets on LSPs, through network 100 to egress at a point in the network remote from router 102. It will be appreciated by the skilled artisan that data traffic flow is multi-directional through an MPLS network topology. Therefore, LER-A (102) is also equipped to function in egress mode. For simplicity of discussion router 102 is considered here in terms of ingress function only.

A directional arrow emanating from system 101 and progressing to router 102 logically illustrates data packets arriving into LER-A from system 101. Router 102 is adapted to decide which data packets require LSP handling and which of those packets will be assigned to specific LSPs. LSPs may be considered transitory paths that can be somewhat permanent, semi-permanent, or very temporary depending on network conditions, including bandwidth availability. Router 102 is configured to establish a new LSP through network 100 if a specific type of requirement associated with arriving data packets so warrants, and an LSP configured according to the requirements does not already exist. Moreover, LSPs may be created manually by network administrators.

Router 102 assigns MPLS labels to data packets that are determined to travel over an LSP. The MPLS label consists basically of a shim entry into the packet header that can be easily identified by a next router without extensive header processing. A value of an MPLS label is that it contains ingress and egress information for an LSP specific to the assigning router. That is, the source and destination address to the next node in the path of the assigned LSP. In this case, there are two separate label assignments issued by router 102 for data packets that will travel over separate LSPs.

A label V1 (103) is assigned to and added to the packet header of all data packets to travel over illustrated LSP link 106 to a next router 105 illustrated herein as a label switching router (LSR-B). LSP link 106 is illustrated herein as a solid directional arrow emanating from LER-A (102) and progressing to LSR-B (105). A label V2 104 is assigned to and added to the packet header of all data packets to travel over illustrated LSP link 108 to router 105. LSP link 108 is illustrated herein as a broken directional arrow emanating from router 102 and progressing to router 105. Thus, the two LSPs identified in this example are separated, one illustrated as a path represented by solid directional arrows (links between nodes) and the other illustrated by broken directional arrows (links between nodes). It will be appreciated by the skilled artisan that there will typically be many more LSPs within MPLS network 100 in actual practice. The inventor illustrates two LSPs for the purpose of simplicity in description.

LSR-B 105 receives LSP packets having the label assignments V1 and V2 at ingress (typically separate port addresses). Instead of having to process the packet header information of those labeled packets, router 105 simply reads the inserted MPLS labels, determines which LSP the packets are assigned to, and then switches the existing labels with new values representing the ingress/egress addresses of router 105 and the destination port information of the next nodes in each LSP path. For example, all data packets arriving with the label containing value V1 are given a new value V11 (107) and forwarded on without header processing. All packets arriving with MPLS value V2 are given a new value V22 (109) and are forwarded on without header processing. At this point the illustrated LSPs split within network 100 in terms of use of common routers in the network.

LSR 105 is illustrated as the only LSR within network 100, however it will be appreciated that in actual practice there will typically be many more LSRs within network 100. The basic function of an LSR is to switch label values for packets and to forward the packets. In this example, the now physically separate LSPs (no common routers) are identified in this example as LSP 1 (solid links) and LSP 2 (broken links). All packets with label value V11 (107) are forwarded to an illustrated LER-C (110) using LSP 1. All data packets with label value V22 are forwarded to an illustrated LER-D (112) over LSP 2. LER-C and LER-D are discussed in terms of egress in this example, however they may also be ingress LER routers.

At LER-C (110) the MPLS label V11 (LSP 1) is stripped from all incoming data packets exhibiting the label and they are forwarded out of MPLS 100 to a next destination, which in this example is an IP-X system 111. At LER-D (112) the MPLS label V22 (LSP 2) is stripped from all incoming data packets exhibiting the label and they are forwarded out of MPLS 100 to a next destination, which in this example is an IP-Y system 113. IP-X and IP-Y are analogous to IP-0 as was described above. Assuming a network having many LSRs and LSPs, it will be appreciated that eliminating processing of header information at each transit node (LSR) in an LSP results in much reduced latency over an LSP from IP-0 to either IP-X or IP-Y, which are destinations for LSP data in this example.

Although it is not shown in FIG. 1, there may also be back-up LSPs configured such that if an LSR router supporting one or more LSPs fails, one or more backup LSPs may be activated wherein the LSPs do not include the failed router in the path. Automatic protection switching (APS) or other known protection mechanisms can be utilized in this regard. However, the switchover to backup LSPs is costly including the cost of the protection software, and is not always successful. If any transit or LER routers in a particular LSP fails without immediate backup, then that LSP fails. It may be that a single router failure may cause failure of many configured LSPs, causing a great deal of network processing to activate all of the backup LSPs formerly supported by the failed router, and a great deal of data loss.

In the background section, it was described that a scalable TNR router is known to the inventor and has a distributed-processor architecture. A router of this type, through further innovation, may be configured for RSVP MPLS or other MPLS implementations wherein processor failure with regard to MPLS server failure can be fault-protected, eliminating a requirement to initiate a mass LPS switchover to get around a point of failure in the network topology. Such an implementation is described in detail below.

Figure 2:
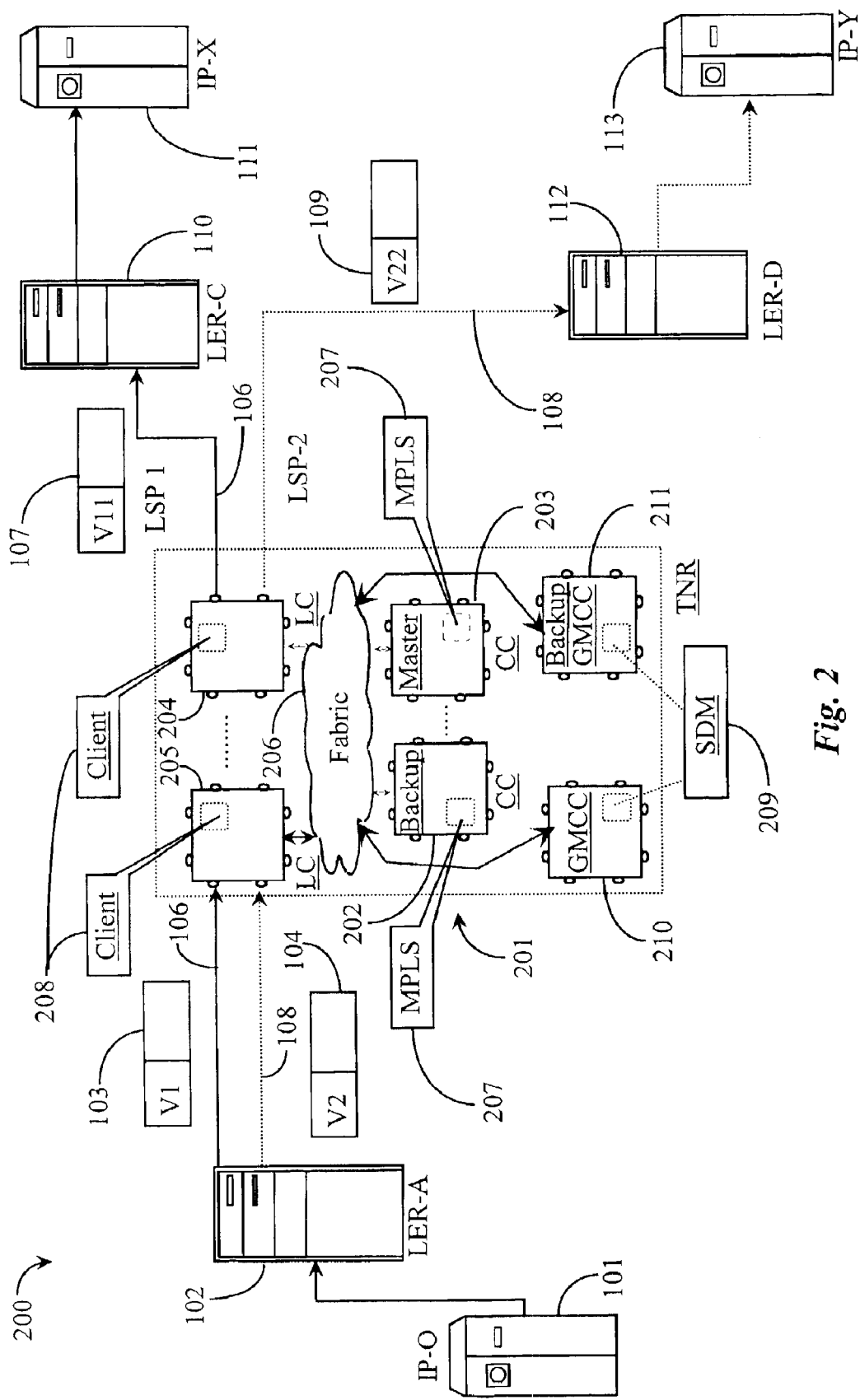
FIG. 2 is an expanded view of the internal components of a TNR enhanced with MPLS fault protection according to an embodiment of the present invention.

FIG. 2 is an expanded view of internal components of a TNR 201 enhanced with MPLS fault protection according to an embodiment of the present invention. In this example, router 201 is a distributed-processor router. TNR 201 in this example replaces transit router LSR 105 described with reference to MPLS network 100 of FIG. 1 above. However, any one or all of the described prior-art routers may be TNR routers in this example. An MPLS network 200 may be assumed to contain at least one TNR router, router 201 in this case.

Elements of the prior-art example of FIG. 1, which are reproduced in this example, retain their original element numbers and shall not be reintroduced, unless such elements are modified to practice the present invention. Network 200 comprises IP host 101, LER 102, LERs 110 and 112, and IP hosts 111 and 113 as was described with reference to FIG. 1. Only TNR 201 is enhanced in this example, to practice the present invention.

TNR 201 comprises a plurality of distributed and cooperating processor-managed units described in the background section of this specification as line cards, control cards, and fabric cards. In this example, there are four illustrated control cards (CC), these being CC 202, CC 203, CC 210 and CC 211. In actual practice there may be typically many more CCs in TNR 201 than are illustrated in this example. The inventor deems that the illustration of four CCs is sufficient for the purpose of explanation of the invention.

CC 203 is designated as a master MPLS CC and is so labeled. CC 202 is designated as a backup MPLS CC and is so labeled. Master and backup MPLS function refer to the states of novel MPLS server application installed on each card, which are described further below.

CC 210 is designated a GMCC and card 211 a backup GMCC as described briefly above. Fabric cards (not individually illustrated) make up fabric 206 represented herein by a network cloud. Fabric 206 serves as an internal data-packet-network of interconnected nodes (cards) forming data paths from ingress ports to egress ports of TNR 201. All cards of TNR 201 communicate using fabric 206. Data traveling through TNR 201 ingresses through a line card (LC) and egresses through a line card as was described with reference to the background section of this specification.

There are two illustrated LCs in this example, LC 205 and LC 204. There will typically be many more than two LCs in TNR 201, however, the inventor deems that the illustration of two such cards is sufficient for explanative purpose. Note that LCs 205 and 204 and CCs 202 and 203 have multiple data ports provided thereon, each port functioning as an ingress/egress port. Although not illustrated in this example, all fabric cards (fabric 206) are similarly ported. There are illustrated 8 ports per card in this example, but there may be fewer or many more ports per card with out departing from the spirit and scope of the present invention.

Data travels through MPLS network 200 in the same way described with reference to MPLS network 100 with an exception of how data is treated at TNR 201. LSP 1 and LSP 2 are illustrated in this example in the same path configuration shown with reference to FIG. 1. The only difference is the fact that TNR 201 is now the transit LSR within network 200.

LSP data entering TNR 201 is illustrated as ingressing into LC 205. LSP 1 (106) is represented by a solid directional arrow and LSP 2 (108) is represented by a broken directional arrow. It will be apparent to the skilled artisan that the LSP data may arrive at the same port in one line card, or may arrive at different ports on different line cards instead of as shown in FIG. 2, but the example shown is adequate for an enabling description.

LSP data, as described earlier, is simply label switched from ingress to egress within TNR 201. The actual data packets in this example egress LC 205 into fabric 206 as illustrated logically herein by a directional arrow. In actual practice, the specific data ports are used. The LSP data travels through internal fabric 206 (from card to card) and ingresses LC 204 from fabric 206 as logically illustrated herein by a directional arrow into LC 204. In one embodiment, a protocol extension known to the inventor as explicit route object may be used to specify an explicit LSP path externally through a network topology and, more granularly, through TNR 201 itself, specifying ingress and egress IP addresses for each node (card/port) that is involved with a specific LSP.

Data egressing LC 204 destined to a next router or routers in this example leaves TNR 201 through egress paths (ports) on LC 204 as illustrated. LSP 1 data is forwarded to LER-C (110) while LSP 2 data is forwarded to LER-D (112). Again, this simple architecture is exemplary only. New labels 107 (V 11) and 109 (V 22) are shown associated with LSPs 1 and 2 respectively as they were with reference to FIG. 1 above.

An MPLS server module 207 is provided in this example and resides on individual CCs within TNR 201. In this particular example, an instance of MPLS 207 resides in CC 203 and another instance resides in CC 202. MPLS 207 on CC 203 is designated and activated as a master MPLS server. MPLS 207 on CC 202 is designated and activated as a backup server. It is noted herein that MPLS server 207 is also implemented as part of a software image distributed to CCs within TNR 201 so that any CC may be selected and activated as a master MPLS server and any CC may be selected and activated as a backup MPLS server. An instance of a software distribution module (SDM) 209 is provided within TNR 201 and resides on the both the Master and the backup GMCC in this example (CC 210 and CC 211).

SDM 209 is a control application running on the active GMCC in the TNR, and is configured in this example to make determinations as to which CC will be activated as a master MPLS server and which CC will be activated as a backup MPLS server. Moreover, SDM 209 is further configured to monitor a master MPLS server, (CC 203) and determine when the monitored instance has failed, and to further command a designated backup MPLS server (CC 202) to become the master server. If for example, CC 202 is commanded by SDM 209 to become a master MPLS server, then SDM 209 will look for and designate yet another CC to perform in the backup server state. Without a backup state running on at least one control card, fault protection is compromised.

An MPLS sever instance comprises a known version of H&J RSVP stack and various novel extensions that provide added functionality, as well as the target services (modules) that provide system interface capability between the rest of the system and the H&J stack including extensions. The server provides the MPLS functionality that is associated with setting up LSPs and engaging in the signaling protocols such as RSVP and LDP with other routers required to set up these LSPs. MPLS server 207, in the master state, is a distribution point for all information required to maintain the MPLS state.

An MPLS client 208 is provided in distributed fashion to LCs within TNR 201. LC 205 and 204 each have an MPLS client 208 residing thereon. An MPLS client comprises applicable data-path code related to all of the LSPs using a particular card. In particular, a client provides the implementation required to program MPLS labels in the LCs. All information required to enable MPLS function is passed to applicable LCs from an MPLS server through fabric 206. In this case, CC 203 is designated as a master MPLS CC, meaning that it has an instance of MPLS 207 running in the master control state. CC 202 is a designated backup for CC 203 meaning that it has an instance of MPLS 207 running in the backup state. It will be assumed in this embodiment that CC 203 controls the states of the client instances on LC 204 and 205. In one embodiment, CC 203 may control all LCs within TNR 201 that are part of a configured and active LSP. In another embodiment, CC 203 may be one of a few or several active CCs running an instance of MPLS in a master state. In such a case, each active master MPLS CC would be responsible for a certain number of line cards. It is noted herein that if more than one master MPLS CC is active, then a like number of backup MPLS CCs must be active in order to provide full fault protection.

In a preferred application, one CC running an MPLS master server (207) and one backup CC running an MPLS server in the backup state is sufficient for protecting MPLS capability within TNR 201. However, the limitation of one running MPLS pair is not specifically required in order to practice the present invention.

In practice of the invention according to a preferred embodiment, when TNR 201 is booted, SDM 209 designates master CC 203 running MPLS 207 as a master server providing MPLS capability within TNR 201 at the level of LCs 205 and 204. SDM selects an available CC, in this case CC 202, as the backup MPLS server by activating instance 207 for that CC in backup state. The first action by MPLS master 203 when it recognizes the new backup MPLS server in the TNR, is to mirror all MPLS state information required to maintain the master state to backup CC 202. After this has been accomplished, master CC 203 passes state change information messages at various state synchronization points in time to backup card 202 during normal MPLS operation.

If, during normal MPLS operation, CC 203 fails, as determined by SDM 209, then SDM 209 issues a command to backup CC 202 to assume the master state. If, at the time of switchover, master CC 203 has messages which are not completely processed, then the new master CC 202 will process the mirrored messages in its queue to completion and send the required information to the clients on LCs 205 and 204 to program the new LSPs.

At this point, SDM 209 will select a new backup CC and activate an MPLS instance on that card as a backup instance. All the appropriate state information is then transferred to the new backup from the new master CC 202. Following this the master will send state change notification messages to the new backup at the state synchronization points just as before. If the newly designated master 202 fails, then the new backup will assume the master state. In this way, there is always a master CC within TNR 201 maintaining the MPLS capability and LSP states.

The method and apparatus of the present invention provides fault protection at the router level, insuring that TNR 201 will not fail in terms of MPLS capability.

At start-up, the MPLS master server on CC203 will mirror all the data structures representing all the state machines required to maintain existing LSPs to the backup server running on CC202. Once this is done, the backup server is considered to be synchronized and ready for normal operation. In normal operation, the master server will send state change notification event messages caused by trigger events to the backup server at various state synchronization points.

There are basically two types of trigger events that initiate MPLS state machine processing at master CC 203. These are command-line interface (CLI) commands that set up LSPs on the ingress LSRs and RSVP messages that set up LSPs on the transit and egress LSRs. The master will mirror any CLI trigger events received to MPLS backup server 207 running on CC 202. CC 202, functioning as a backup, places all CLI trigger events and associated data in a transaction queue for pending transactions, wherein it will actually process the messages if SDM 209 commands CC 202 to assume the master state before the old master (CC 203) finishes processing the trigger events.

RSVP messages are not mirrored to CC 202 because RSVP is a soft-state protocol, meaning that RSVP messages are resent after a timeout period. However, CC 203 will send state change notification messages and associated data to CC 202 during well-established state synchronization points in the implementation of the various RSVP state machines. This will cause the backup server running on CC 202 to process the data provided and to create the state machines resulting from this state change notification.

It is important that a backup MPLS server send acknowledgements to a master MPLS server when receiving data. It is also important that notices be sent when certain events are processed. The state machines that are required to maintain the state for MPLS and LSPs are described briefly below.

The MPLS state machine contains all of the data describing the current MPLS implementation within TNR 201. A tunnel state machine contains all of the data describing tunnel state. A makes-before-breaks (MBB) state machine contains all of the data required for backup tunnel creation and maintenance. An explicit-route-object (ERO) state machine contains explicit LSP path data for explicitly defined LSPs. An ingress LSP state machine contains all of the data required at ingress for LSP label binding. A transit LSP state machine contains all of the data about an LSP being created but not finished. An RESV state machine contains all of the required data about bandwidth reservation results pertaining to any particular LSP. An interface state machine provides all of the configuration data about external interfaces and application program interfaces.

There are also state machines that define the RSVP stack. These are the LMS state machine, UP_PSB (path state block) state machine, DOWN_PSB state machine, DOWN_RSB state machine, UP_RSB state machine, neighbor state machine, and interface state machine.

MPLS server 207 contains all of the required modules for enabling RSVP MPLS including all interface modules required for interface to external router components.

Figure 3:
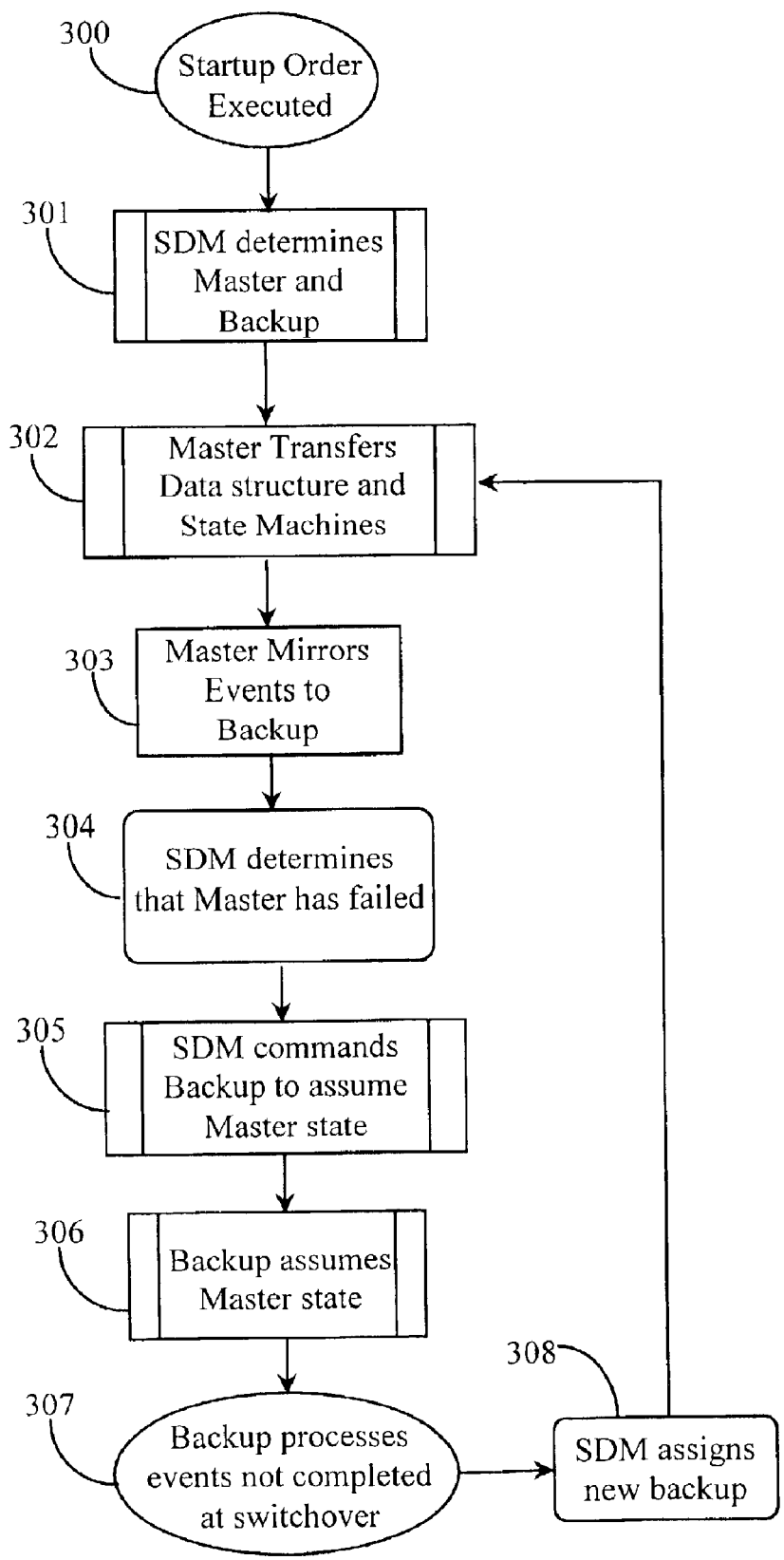
FIG. 3 is a block diagram illustrating internal MPLS assignment and switchover from a master server to a backup server according to an embodiment of the present invention.

FIG. 3 is a flowchart illustrating internal MPLS assignment at startup and switchover from a master server to a backup server upon failure of the master according to an embodiment of the present invention. At step 300 a startup or boot command is received at a TNR analogous to TNR 201 of FIG. 2. At step 301 a software distribution module (SDM) running on a global master control card (GMCC) determines a control card to activate for master MPLS server and a control card to activate as a backup MPLS server.

A GMCC is the first control card in a TNR system to boot and has the required software image data for determining and assigning responsibilities to the other CCs in the system. SDM is part of that software image. After a master and backup MPLS server has been determined and commands have been issued for task activation, at step 302, the designated master MPLS server transfers its data structures representing any existing state machines and any additional data required to maintain those state machines to the designated backup MPLS server.

At step 303 the master MPLS server continues to mirror required events and other data to the backup MPLS server during normal router operation. Step 303 is an ongoing step that requires synchronization between the backup and the master. For example, if the master is processing an event that needs to be replicated to the backup in case of failure of the master, then all of the results and data received from target services must also be replicated to the backup. As long as the master is alive and events transpire, then completed events may be deleted from the queue at the backup server. A completion notification is sent to the backup from the master when events processed at the master are finished.

SDM running on the master continually monitors the state and performance of the master and determines at step 304 that the master has failed according to state results. A master may fail at any time during processing. At step 305, the SDM running on the GMCC sends a command to the backup MPLS server to assume the state of master server. The command at step 305 is immediately issued upon failure of the master. If the failure includes the SDM module then the SDM module running on the backup CC issues the command internally.

At step 306 the backup MPLS server begins transitioning to a master state as a result of the command from SDM. At this step, there are several processes that must be accomplished. All of the state machines must register with external resources as master sates and begin performing the distribution and processing duties of the master MPLS server with respect to commands and data distributed to applicable line cards supporting LSP paths.

At step 307, the backup MPLS server, now functioning in the master state, processes any pending events that were received by the former master but not yet completed. In this way no data is lost during the switchover. At step 308, the SDM running on the new master selects and activates a new backup MPLS server on another available CC. The process then resolves back to step 302, wherein the master transfers all of the data structures and state machines to the new backup sever before replicating and sending event data.

In a preferred embodiment of the present invention, all data required to maintain MPLS function within a TNR exists at a designated backup MPLS server at the time of a detected master server failure. It is also noted herein that the granularity of LSPs set up in the network topology may be extended to be applicable to internal network paths through line and fabric cards interconnected within the TNR.

The skilled artisan will recognize that there are many alterations that might be made in the embodiments of the invention described as examples in this specification, without departing from the spirit and scope of the invention. Such variations include variations in the number of cards and other components, the division of functionality among various components and portions of a system, and the manner in which software may be prepared and provided. It is in the functionality that the invention lays rather than in the specific and narrow manner in which that functionality is implemented. The claims which follow must therefore be afforded broad interpretation in light of the descriptions in the specification.

What is claimed is:

1. A method for providing fault-tolerance for Multi-Path Label Switching (MPLS) functionality in a multi-processor network routing node, comprising the steps of;
    (a) implementing an MPLS server application including state information, on a first and a second processor in the node;
    (b) designating the MPLS server on the first processor as a master server and the MPLS server on the second processor as a backup server, and providing MPLS functionality in the node with the master MPLS server;
    (c) directing all required MPLS events to both the master and the backup MPLS servers during operation;
    (d) monitoring operation of the master server; and
    (e) in the event of failure of the master server, designating the backup server as the master, allowing MPLS functions to continue on the routing node;
    wherein, in step (d), monitoring is accomplished by a software distribution module (SDM) executing on a third processor in the node.

2. The method of claim 1 further comprising client MPLS applications executing on one or more processors in the node dedicated to processing incoming data packets, further comprising a step for passing information from the master MPLS server to the one or more MPLS clients.

3. The method of claim 2 wherein the processors dedicated to processing incoming data packets comprise line cards (LC) with processors, the LCs each comprising one or more ports interfacing with the network for receiving and sending data packets, and control cards (CC) with processors, the CCs for providing control functions, and the MPLS servers are established on control cards, one of which becomes an MPLS master control card, and the other an MPLS backup control card.

4. The method of claim 3 comprising a further step, once a backup MPLS CC has become the Master MPLS CC, of designating and enabling a new backup MPLS CC.

5. The method of claim 1 wherein the processors upon which MPLS servers are established are control cards (CC) with processors, the CCs for providing control functions, and the SDM is established on a CC other than those upon which MPLS servers are established.

6. The method of claim 5 wherein a primary SDM is established on a first global master CC (GMCC) and a backup SDM is established on a global backup CC (GBCC), and wherein the global backup becomes the global master in the event of failure of the global master.

7. The method of claim 6 comprising a further step, once a GBCC becomes a GMCC, for establishing and enabling a new GBCC.

8. The method of claim 6 wherein the GMCC determines server assignments at startup of the routing node.

9. The method of claim 8 wherein state information and data structures are copied from the MPLS master server to the MPLS backup server at startup of the routing node after server task assignment and initialization.

10. The method of claim 1 comprising a further step, once a backup MPLS server has become the master MPLS server, of designating and enabling a new backup MPLS server.

11. The method of claim 1 wherein the network is the Internet network.

12. The method of claim 1 wherein, in step (a), the MPLS server application is configured with a resource reservation protocol (RSVP) stack.

13. The method of claim 1 wherein the MPLS server applications are included with the SDM in a bootable software image.

14. A control system for providing fault-tolerance for Multi-Path Label Switching (MPLS) functionality in a multi-processor network routing node, comprising:
a master MPLS server application including state information, implemented on a first processor in the node; and
a backup MPLS server application implemented on a second processor in the node and
a software distribution module (SDM) executing on a third processor in the node;
characterized in that the master server provides MPLS functionality with all MPLS events directed to both the master and the backup server, and control is switched to the backup server as master in the event of failure of the master server and further characterized in that the SDM monitors master MPLS function, and implements switchover as necessary.

15. The control system of claim 14 further comprising client MPLS applications executing on one or more processors in the node dedicated to processing incoming data packets, wherein information is passed from the master MPLS server to the one or more MPLS clients.

16. The control system of clam 15 wherein the processors dedicated to processing incoming data packets comprise line cards (LC) with processors, the LCs each comprising one or more ports interfacing with the network for receiving and sending data packets, and control cards (CC) with processors, the CCs for providing control functions, and the MPLS servers are established on control cards.

17. The control system of claim 16 wherein, once a backup MPLS CC has become the Master MPLS CC, a new backup MPLS CC is designated and enabled.

18. The control system of claim 14 wherein the processors upon which MPLS servers are established are control cards (CC) with processors, the CCs for providing control functions, and the SDM is established on a CC other than those upon which MPLS servers are established.

19. The control system of claim 18 wherein a primary SDM is established on a first global master CC (GMCC) and a backup SDM is established on a global backup CC (GBCC), and wherein the global backup becomes the global master in the event of failure of the global master.

20. The control system of claim 19 wherein, once a GBCC becomes a GMCC, a new GBCC is established and enabled.

21. The control system of claim 19 wherein the GMCC determines server assignments at startup of the routing node.

22. The control system of claim 21 wherein state information and data structures are copied from the MPLS master server to the MPLS backup server at startup of the routing node after server task assignment and initialization.

23. The control system of claim 14 once wherein, the backup MPLS server has become the master MPLS server, a new backup MPLS server is designated and enabled.

24. The control system of claim 14 wherein the network is the Internet network.

25. The control system of claim 14 wherein the MPLS server application is configured with a resource reservation protocol (RSVP) stack.

26. The control system of claim 14 wherein the MPLS server applications are included with the SDM in a bootable software image.

27. A network routing node comprising:
a plurality of processors; and
a control system for providing fault-tolerance for Multi-Path Label Switching (MPLS) functionality, the control system having a master MPLS server application including state information, implemented on a first of the plurality of processors, and a backup MPLS server application implemented on a second of the plurality of processors in the node and
a software distribution module (SDM) executing on at least one processor of the plurality of processors in the node;
characterized in that the master server provides MPLS functionality MPLS events directed to both the master and the backup server, and control is switched to the backup server as master in the event of failure of the master server and further characterized in that the SDM monitors master MPLS function, and implements switchover as necessary.

28. The network routing node of claim 27 further comprising client MPLS applications executing on one or more of the plurality of processors in the node, the clients dedicated to processing incoming data packets, wherein information is passed from the master MPLS server to the one or more MPLS clients.

29. The network routing node of claim 28 wherein the clients dedicated to processing incoming data packets comprise line cards (LC) with processors, the LCs each comprising one or more ports interfacing with the network for receiving and sending data packets and control cards (CC) with processors, the CCs for providing control functions, and the MPLS servers are established on control cards.

30. The network routing node of claim 29 wherein, once a backup MPLS CC has become the Master MPLS CC, a new backup MPLS CC is designated and enabled.

31. The network routing node of claim 27 wherein the processors upon which MPLS servers are established are control cards (CC) with processors, the CCs for providing control functions, and the SDM is established on a CC other than those upon which MPLS servers are established.

32. The network routing node of claim 32 wherein a primary SDM is established on a first global master CC (GMCC) and a backup SDM is established on a global backup CC (GBCC), and wherein the global backup becomes the global master in the event of failure of the global master.

33. The network routing of claim 32 wherein, once a GBCC becomes a GMCC, a new GBCC is established and enabled.

34. The network routing node of claim 32 wherein the GMCC determines server assignments at startup of the routing node.

35. The network routing node of claim 34 wherein state information and structures are copied from the MPLS master server to the MPLS backup server at startup of the routing after server task assignment and initialization.

36. The network routing node of claim 27 wherein, once the backup MPLS server has become the master MPLS server, a new backup MPLS server is designated and enabled.

37. The network routing node of claim 27 wherein the network is the Internet network.

38. The network routing node of claim 27 wherein the MPLS server application is configured with a resource reservation protocol (RSVP) stack.

39. The network routing node of claim 27 wherein the MPLS server applications are included with the SDM in a bootable software image.

* * * * *